United States Patent
Tyldesley

(10) Patent No.: US 8,093,797 B2
(45) Date of Patent: Jan. 10, 2012

(54) ELECTROLUMINESCENT DISPLAYS

(75) Inventor: William Frank Tyldesley, Diss (GB)

(73) Assignee: MFlex UK Limited, Cambridge (GB)

( * ) Notice: Subject to any disclaimer, the term of this patent is extended or adjusted under 35 U.S.C. 154(b) by 445 days.

(21) Appl. No.: 12/113,239

(22) Filed: May 1, 2008

(65) Prior Publication Data
US 2009/0273275 A1  Nov. 5, 2009

(51) Int. Cl.
H05B 33/00 (2006.01)
H05B 33/14 (2006.01)
H05B 33/20 (2006.01)

(52) U.S. Cl. ........ 313/503; 313/501; 313/506; 313/509; 428/917

(58) Field of Classification Search .......... 313/500–512; 428/917
See application file for complete search history.

(56) References Cited

U.S. PATENT DOCUMENTS

| | | | | |
|---|---|---|---|---|
| 5,300,858 A | * | 4/1994 | Nikaido | 313/503 |
| 6,580,224 B2 | * | 6/2003 | Ishii et al. | 313/503 |
| 7,816,862 B2 | * | 10/2010 | Noguchi et al. | 313/506 |
| 2002/0003594 A1 | | 1/2002 | Ishii et al. | |
| 2003/0034729 A1 | * | 2/2003 | Yano et al. | 313/503 |
| 2003/0218420 A1 | | 11/2003 | Zovko | |
| 2005/0029928 A1 | * | 2/2005 | Tyldesley | 313/503 |
| 2007/0001585 A1 | * | 1/2007 | Hasegawa | 313/502 |

FOREIGN PATENT DOCUMENTS

| | | |
|---|---|---|
| GB | 2404774 | 9/2005 |
| GB | 2 442 724 A | 4/2008 |
| GB | 2449061 A | 11/2008 |
| JP | 3008294 | 1/1991 |
| JP | 6349580 | 12/1994 |
| JP | 10125465 A * | 5/1998 |
| JP | 2004 228009 A | 8/2004 |
| WO | 2008/075001 A2 | 6/2008 |

OTHER PUBLICATIONS

Satoh, T. et al: Title: High-Luminosity Organic-Dye-Dispersed Inorganic Electroluminescent Panel, Electronics Letters, IEE Stevenage, GB, vol. 43, No. 19, Sep. 13, 2007, pp. 1047-1048, ISSN: 0013-5194.
Official Communication issued in corresponding United Kingdom Application No. GB0705836.5, mailed on May 11, 2011.
Tyldesley et al., "Electroluminescent Displays", U.S. Appl. No. 11/813,418, filed Jan. 3, 2008.

* cited by examiner

*Primary Examiner* — Mariceli Santiago
(74) *Attorney, Agent, or Firm* — Keating & Bennett, LLP

(57) ABSTRACT

An electroluminescent layer for a light. The light includes a phosphor with a fluorescent pigment or dye.

16 Claims, 1 Drawing Sheet

ELECTROLUMINESCENT DISPLAYS

TECHNICAL FIELD

This invention is concerned with electroluminescent displays and components thereof and, in particular, but not exclusively, displays that are electroluminescent/liquid crystal hybrids.

BACKGROUND OF THE INVENTION

Certain materials are electroluminescent—that is, they emit light, and so glow, when an electric field is generated across them. The first known electroluminescent materials were inorganic particulate substances such as zinc sulphide, while more recently-found electroluminescent materials include a number of small-molecule organic emitters known as organic light emitting diodes (OLEDs) and some plastics—synthetic organic polymeric substances—known as light-emitting polymers (LEPs). Inorganic particulates, in a doped and encapsulated form, are still in use, particularly when mixed into a binder and applied to a substrate surface as a relatively thick layer; LEPs can be used both as particulate materials in a binder matrix or, with some advantages, on their own as a relatively thin continuous film.

This electroluminescent effect has been used in the construction of displays. In some types of displays an electroluminescent (EL) material—generally referred to in this context as a phosphor—is provided to form a backlight which can be seen through a mask that defines whatever characters the display is to show. In other types, the displays are arranged with shaped electrodes such that small individual areas of EL material can be selectively activated. These displays have many applications; examples are a simple digital time and date display (to be used in a watch or clock), a mobile phone display, the control panel of a household device (such as a dishwasher or washing machine), and a handheld remote controller (for a television, video or DVD player, a digibox, stereo or music centre or similar entertainment device).

International Patent Application No: WO 2005/0121878 describes a type of display that is an electroluminescent/liquid crystal hybrid. In such a display, an electroluminescent backlight is combined with a Liquid Crystal (LC) mask that is switchable in individual areas, between "on"/transparent (so that the backlight can shine therethrough) and "off"/opaque (so that the backlight's light is blocked thereby). The LC mask and the EL backlight are formed as a single integral unit wherein both components (the LC mask and EL backlight) are supported on a single substrate—the EL backlight being created as an electroluminescent material layer mounted directly on/behind the layer of liquid crystal material.

It has been found that in conditions where there is high intensity light incident on the display, such as in bright daylight, the weakly emissive EL backlight is difficult to make out as the light emitted by the EL backlight is overwhelmed by the brighter incident light reflected from the EL backlight. As a result, instead of a coloured icon, the display appears pale and colourless. Different phosphor colours become indistinguishable, all appearing pale, giving a "washed out" look to the display.

Attempts have been made to overcome this problem by ink jet coating or printing a transparent colour filter layer in front of the EL backlight and the LC mask such that undesirable wavelengths of incident light are absorbed. This ensures that the icon remains the desired colour. However, the filter layer affects the electric field across the EL and PDLC layers, adversely affecting performance, and the display is expensive to manufacture, requiring an additional print pass for each colour filter layer (typically one for each phosphor colour).

SUMMARY OF THE INVENTION

According to a first aspect of the invention, there is provided an electroluminescent layer for a light comprising phosphor with a fluorescent pigment or dye.

A layer according to the invention is advantageous as when incorporated in a light, such as a backlight for a display, an electric field can be applied across the electroluminescent layer to cause the phosphor to emit light, and in conditions where there is high intensity light incident on the light, the fluorescent pigment or dye of the layer colours light reflected from the phosphor particles/backlight to maintain the desired colour contrast of the light. Therefore, a pale, washed out look to the light is avoided, while the number of print passes to manufacture the light are reduced compared to those lights having a filter layer.

The fluorescent pigment of dye may emit light that substantially matches the colour of the light emitted by the phosphor. In this way, the light retains its emissive colour in both low and high intensity incident light conditions. Substantially matches means that the wavelength of the light emitted by the fluorescent pigment is within ±50 nm of the wavelength of light emitted by the phosphor.

In one embodiment, the electroluminescent layer comprises a fluorescent pigment rather than a dye. It is believed that pigment is more lightfast than dissolving a dye in the electroluminescent layer.

The phosphor is usually contained within a binder matrix. Typically, the binder matrix consists of a fluoropolymer resin dissolved in organic solvents, although different options include UV cureable binder resins as well as cast polyurethanes. The fluorescent pigment may be mixed with the phosphor matrix in low concentrations, typically less then 5% pigment to phosphor matrix, preferably 1% pigment to phosphor matrix. More than 5% pigment may cause the light emitted to become too intense and can needlessly reduces light output, less than 1% does not contribute enough colour.

According to a second aspect of the invention there is provided a light comprising an electroluminescent layer according to the first aspect of the invention disposed between a front electrode and a rear electrode such that application of a voltage across the electrodes will cause the phosphor in the electroluminescent layer to luminesce.

The light may be a backlight for a display. From the front to back the backlight may comprise:

an electrically-insulating transparent front layer known as the substrate, usually made of glass or plastic, such as polyethylene terephthalate (PET) or polyethylene naphthalate (PEN);

a first electrically-conductive film, for example, made from a material such as indium tin oxide (ITO), forming the front electrode, an electroluminescent (EL) layer according to the first aspect of the invention;

an electrically-insulating layer of a material—usually a ceramic—having a relatively high dielectric constant (relative permittivity) of around 50 (in some applications, such as the present invention, this layer is most desirably significantly optically-reflective, while in others it preferably has low reflectivity); and disposed over the rear face of the electrically-insulating layer, an electrically conductive film forming the rear electrode.

It will be understood that the term "front" as used herein means the side of the light/display from which the light/display is to be viewed.

One of the front and rear electrodes may be a single electrode extending across all the areas of the electroluminescent layer that can be illuminated and the other of the front and rear electrodes is patterned to define the areas of the electroluminescent layer that can be selectively illuminated. Preferably, the front electrode is a single electrode extending over all areas of the electroluminescent layer that can be illuminated and the rear electrode is patterned to define the areas of the electroluminescent layer that can be selectively illuminated. However, in another embodiment both electrodes are patterned to define the areas of the electroluminescent layer that can be selectively illuminated.

In one arrangement, the electroluminescent layer comprises discrete areas that emit different coloured light. These discrete areas may define different icons/pixels for a display and match in size and shape the patterned electrode(s).

According to a third aspect of the invention there is provided a display comprising a backlight according to the second aspect of the invention.

The display is advantageous as no filter layer is required that could adversely affect the electric field across the electroluminescent layer. Eliminating the need for a filter layer reduces the manufacturing costs of the display because fewer printed layers are required.

The display may further comprise a liquid crystal mask disposed in-front of the electroluminescent layer.

The LC material might be any one of the main types of such material—such as nematic and cholesteric or chiral nematic—the requirement is, generally, for a liquid-crystal-based material that allows polariserless high contrast electro-optical shuttering operation between a field "on" state that is optically transmissive and a base field "off" state that is less transmissive than the "on" state. Preferably, the liquid crystal contains a dye. In one arrangement, the liquid crystal includes up to 6% by weight of a dye, preferably a dichroic dye. In a preferred arrangement, levels of dye in the liquid crystal are 3-5% by weight. The dye attaches to the liquid crystal molecules and acts to obscure light when no field is applied across the LC material but when a field is applied, the dye molecules are aligned for allowing the transmission of light.

Using such a material, the combination of a liquid crystal shutter in front of an electroluminescent display results in a hybrid display that not only emits light when activated but also changes reflectivity when activated. This type of hybrid display can have good visibility in a very large range of lighting conditions—from pitch darkness to full sunlight (typically considered the highest ambient light conditions).

There is another significant advantage related to nematic materials: selection of a liquid crystal material which absorbs light in the absence of an electric field and transmits light when an electric field is present allows the same electric field to be used to drive the electroluminescent material as is used to drive the liquid crystal material. In the absence of an electric field, the liquid crystal material absorbs incident ambient light and the electroluminescent material does not generate any light so the display element appears dark. When an electric field is applied, the liquid crystal transmits both incident ambient light, which subsequently reflects back out off the electroluminescent layer behind it, and also the light now generated by the electroluminescent layer, so the display appears light.

The LC mask and the EL backlight may be constructed as a single entity. By this, it is meant that the LC mask is adhered to the EL backlight or sandwiched between layers of the display to be immovable with respect to the backlight.

The LC mask is preferably located between the layer of EL material and front electrode such that, in use, the electrodes generate an electric field across both the layer of EL material and the LC mask. However, alternatively, the LC mask and layer of EL material may be activated by separate electrodes.

While the LC mask can be created as a layer mounted directly on/behind the layer of EL material, it is possible to provide a polymer interlayer between the LC mask and EL backlight.

These and other features of the present application will become apparent to one of ordinary skill in the art upon review of the following detailed description when taken in conjunction with the drawings and appended claims.

BRIEF DESCRIPTION OF THE DRAWINGS

An embodiment of the invention is now described, though by way of illustration only, with reference to the accompanying drawings in which.

DETAILED DESCRIPTION

Figure 1:
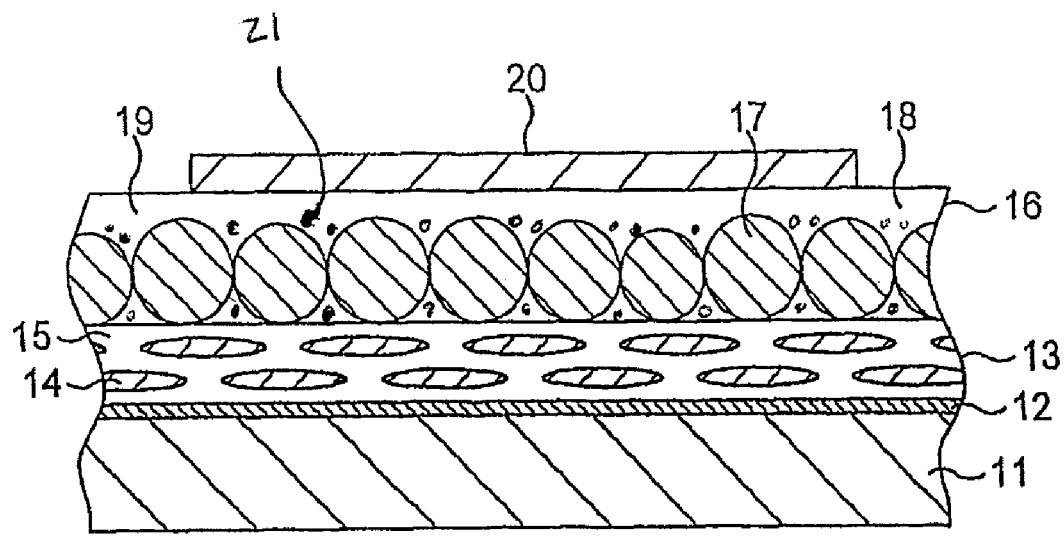
FIG. 1 shows a section through a display according to a first embodiment of the invention.

The structure of the first embodiment of the display of the invention depicted in FIG. 1 of the accompanying drawings can be seen to be, from front to back:

a relatively thick protective electrically-insulating transparent front layer (11; the substrate);

over the rear face of the substrate 11, a very thin transparent electrically-conductive film (12) forming the front electrode of the display;

covering the rear face of the front electrode 12, a relatively thin layer (13) of LC material (14) physically-stabilised by being dispersed within a supporting polymer matrix (15);

formed directly on, and covering the rear face of, the liquid crystal layer (13), a relatively thin electroluminescent layer (16);

over the rear face of the electroluminescent layer (16), a relatively thin optically-reflective electrically-insulating layer (19) of a relatively high dielectric constant material (in the Figure this layer is shown as a seamless extension of the electroluminescent layer (16)); and disposed over the rear face of the reflective electrically-insulating layer (19), an electrically-conductive film (20) forming the rear electrode(s) of the display.

In addition, the back electrode layer may be covered with a protective film (not shown here).

The front and rear electrodes together define discrete areas of both the liquid crystal layer and the electroluminescent layer (16) that can be selected to be switched "on" or "off".

It will be understood that the term "relatively thick" means thicknesses in the range of 30 to 300 micrometers. Furthermore, it will be understood that the term "relatively thin" means thicknesses of 50 micrometers or less. In a preferred embodiment, the relatively thick layers are around 100 micrometers and the relatively thin layers are 25 micrometers or less.

The dielectric constant of the electrically insulating layer may be around 50.

The electroluminescent layer (16) comprises phosphor material (17) and fluorescent pigment (21) dispersed within a supporting matrix (18). The fluorescent pigment (21) is chosen such that the colour of light emitted by the fluorescent pigment (21) matches that emitted by the phosphor. Examples of suitable fluorescent materials are Radglo fluorescent pigments made by Radiant Color Corporation. It has been found that the following combinations achieve a suitable colour matched electroluminescent layer:

Radglo PC21 Green with Dupont high bright green phosphor 8164,

Radglo PC29 Blue with Dupont high bright blue phosphor 8160,

Radglo PC24 orange red with Dupont orange phosphor 7182.

The electroluminescent layer typically comprises about 1% of Radglo pigments to binder matrix. To form the electroluminescent layer (16), the phosphor binder matrix is simply mixed with the fluorescent pigment (21). It will be understood that other phosphor binder materials could be used, such as Electra, and other fluorescent pigments could be used, such as the Capricorn Chemicals range of fluorescent pigments.

In this embodiment, the fluorescent pigment comprises a polymer resin, which has dye dissolved/melted into it, which is in turn finely divided to make a pigment. This pigment is then put into the binder matrix. It is believed that the pigment is insoluble and therefore, does not dissolve in the polymer matrix, but the pigment vehicle softens somewhat over time. Therefore, leaving the pigment and binder matrix a day or two is believed to aid mixing and printing of the EL layer.

The use of an insoluble pigment is believed to produce colour that is more lightfast than simply dissolving dye in the EL binder.

In one embodiment, the electroluminescent layer comprises discrete areas that emit different coloured light. These discrete areas define different icons/pixels of the display and match in size and shape the discrete areas defined by the electrodes. It will be understood, however, that the electroluminescent layer may emit only a single colour of light.

Figure 2:
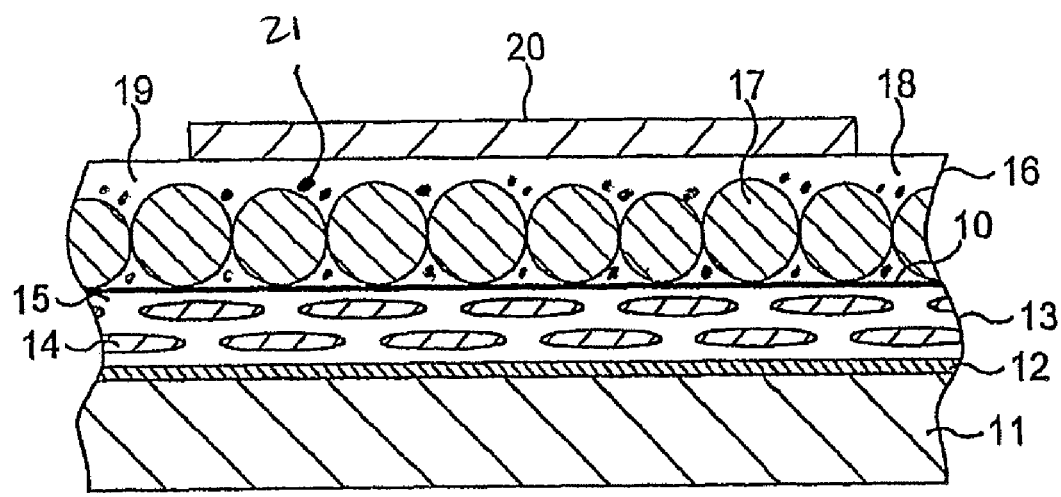
FIG. 2 shows a section through a display according to a second embodiment of the invention.

In an alternative embodiment, shown in FIG. 2 of the accompanying drawings, the EL and LC materials are not directly formed on one another, but are instead separated by an insulating interlayer (10). In all other aspects, the embodiments are the same and common reference numerals have been used.

It should be apparent that the foregoing relates only to the preferred embodiments of the present application and that numerous changes and modification may be made herein by one of ordinary skill in the art without departing from the general spirit and scope of the invention as defined by the following claims and the equivalents thereof.

I claim:

1. An electroluminescent layer for a backlight, comprising:
   phosphor; and
   a fluorescent pigment or dye; wherein
   the fluorescent pigment or dye colours light reflected by the backlight and/or the phosphor to match a colour that substantially matches a colour of light emitted by the phosphor.

2. An electroluminescent layer according to claim 1, wherein the phosphor is part of a binder matrix.

3. An electroluminescent layer according to claim 2, further comprising the fluorescent pigment; wherein
   the fluorescent pigment is mixed in with the binder matrix.

4. An electroluminescent layer according to claim 3, wherein a phosphor matrix of the binder matrix and the fluorescent pigment comprises less than about 5% fluorescent pigment by weight.

5. An electroluminescent layer according to claim 4, wherein a phosphor matrix of the binder matrix and the fluorescent pigment comprises about 1% fluorescent pigment by weight.

6. A light comprising an electroluminescent layer according to claim 1 disposed between a front electrode and a rear electrode such that application of a voltage across the front and rear electrodes causes the phosphor in the electroluminescent layer to luminesce.

7. A light according to claim 6, wherein the light is a backlight for a display.

8. A backlight according to claim 7, wherein from a front to a back the backlight comprises:
   an electrically-insulating transparent front layer defining a substrate;
   a first electrically-conductive film defining the front electrode;
   the electroluminescent layer;
   an electrically-insulating layer made of a material having a dielectric constant of around 50; and
   disposed over a rear surface of the electrically-insulating layer, an electrically conductive film defining the rear electrode.

9. A backlight according to claim 8, wherein one of the front and rear electrodes is a single electrode extending across all areas of the electroluminescent layer that can be illuminated and the other of the front and rear electrode is patterned to define the areas of the electroluminescent layer that can be selectively illuminated.

10. A backlight according to claim 9, wherein the front electrode is a single electrode extending over all of the areas of the electroluminescent layer that can be illuminated and the rear electrode is patterned to define the areas of the electroluminescent layer that can be selectively illuminated.

11. A backlight according to claim 8, wherein the both the front electrode and the back electrode are patterned to define areas of the electroluminescent layer that can be selectively illuminated.

12. A backlight according to any one of claim 9, wherein the electroluminescent layer comprises discrete areas that emit different coloured light.

13. A backlight according to claim 12, wherein the discrete areas define different icons/pixels for a display and match in size and shape the patterned electrode(s).

14. A display comprising a backlight according to claim 7.

15. A display according to claim 14 comprising a liquid crystal mask disposed in-front of the electroluminescent layer.

16. A display according to claim 14 without a colour filter in front of areas of the electroluminescent layer that can be illuminated.

* * * * *